Jan. 20, 1959     O. J. BRATZ     2,869,905
CONDUIT AND FITTING ASSEMBLIES
Filed May 11, 1953
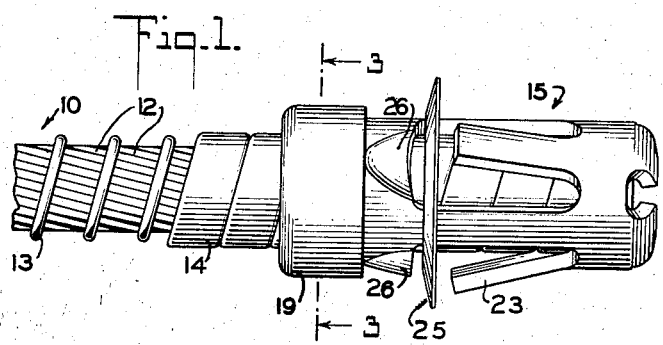
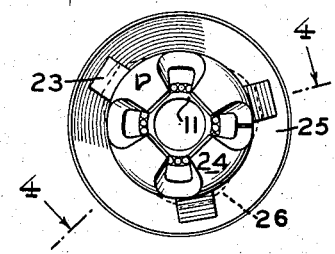
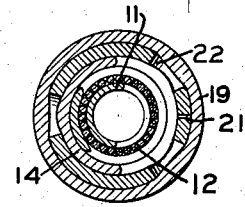
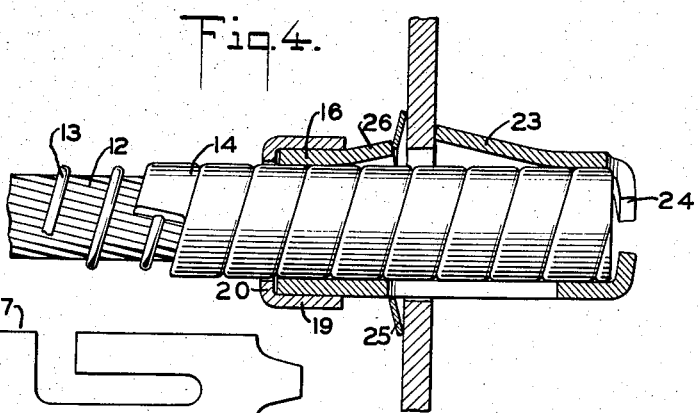
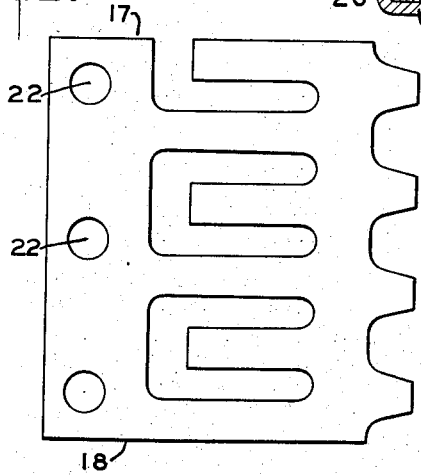
OTTO J. BRATZ
INVENTOR
BY *James T. Bethell*

United States Patent Office 2,869,905
Patented Jan. 20, 1959

2,869,905

CONDUIT AND FITTING ASSEMBLIES

Otto J. Bratz, Adrian, Mich., assignor to American Chain & Cable Company, Inc., Bridgeport, Conn., a corporation of New York Application May 11, 1953, Serial No. 353,951

1 Claim. (Cl. 287—78)

This invention relates to flexible conduits and fittings therefor. Present day flexible conduits, utilized in Bowden wire mechanisms, are required to resist extension under rather high axial loads, as well as to resist compression. Further, they are required to be quite strong and capable of flexure without fatigue or other effects which might result in failure.

Because of these required characteristics, the body of a conduit as now made includes wire hardened by drawing as the stress resisting component. One type includes an outer layer of a number of wires laid in coarse pitch. Cutting threads, grooves or the like in these outer wires, or otherwise deforming them to enable the attachment of a fitting is difficult and introduces a region of concentrated stress which would result in early failure of the conduit.

As it is in many cases necessary to provide a fitting of strength commensurate with the strength of the conduit, and at the same time of minimum weight, it would be desirable if the fitting also would be of hard, tempered material. In particular, a fitting made of elastic or spring material has many advantages. To attach such a fitting to such a conduit, is one of the objects of the present invention.

Referring now to the drawings, which show a preferred form of the invention,

Fig. 1 is a side view of a conduit and fitting assembly;
Fig. 2 is an end view of the assembly shown in Fig. 1;
Fig. 3 is a section taken on line 3—3 of Fig. 1;
Fig. 4 is a section taken on line 4—4 of Fig. 2 showing the assembly in place in a typical application; and
Fig. 5 is a blank from which a part of the fitting is fabricated.

The conduit 10 is selected as typical of the type of conduit which the present fitting and conduit assembly can include. An inner, flat ribbon 11 is helically wound, with its edges close to but not touching each other, to form the inner surface of the conduit, and to support the overlying layers. A plurality of wires 12 is laid around the helical ribbon, with coarse pitch, to constitute the main strength-giving component of the conduit. These wires are relatively hard, to give them the necessary elastic qualities. Surrounding the wires 12 is a helical wire 13, which, as its chief function is merely to hold the wires 12 in place, can have its convolutions widely spaced.

The conduit so far described is fabricated in continuous machines, similar to stranders, with the necessary motions to result in the structure described. As the conduit cannot be cut without some displacement of the layers of wire of which it is made, recourse is had to the wrapping 14, as described in my Patent No. 2,137,712. In that patent, the wrapping is applied to the conduit at the region where a cut is to be made, and the cut is made intermediate the ends of the wrapping. A swaging step is also there described. In the present instance, the swaging after cutting may be eliminated, or, if utilized, must be limited in amount to leave the wrapping 14 still swagable to some extent.

A fitting 15 is to be applied to the end of the conduit. For reasons which will appear later, this fitting is made of tempered steel stock, which is, of course, quite hard and incapable of flow under swaging pressure. Although bendable, it cannot be stretched. As shown in Fig. 4, a cylindrical portion 16 forms part of the fitting. This portion is formed in any way desired, but the simplest method is to roll the blank shown in Fig. 5 into a cylinder. It is essential, for the successful application of the fitting, however, that the edges 17 and 18 be a small distance apart, and that they do not abut against each other after the fitting is inserted on the wrapping.

A collar 19 is placed over the tubular portion of the fitting 15. This collar is made of swagable material, and may have an inturned flange 20, for appearance and also to facilitate assembly. After applying the fitting and collar over the wrapping, swaging pressure is exerted on the collar 19. This constricts the collar, and, at the same time, causes the cylindrical portion of the fitting to constrict around the wrapping 14. As the fitting material can yield only by bending, because of its hard, elastic nature, the gap between the edges 17 and 18 is seen to be necessary for successful practice of the invention. In so bending and constricting, the tubular portion of the fitting also causes a flow of the wrapping 14. If the wrapping has not been flowed to closely conform to the wires of the conduit prior to this step, it will do so now, securely anchoring the wrapping to the conduit proper.

It will be understood that a single gap in the tubular portion is sufficient, but more may be employed if desired. It is not theoretically necessary that such a gap be present in the completed assembly after swaging, but as it does no harm and allows for variation in diameter of the components, it may exist at the completion of the swaging operation if desired. This gap shows in Fig. 3 at 21. Also, as a variation, the parts may be so sized as to prevent further swaging of the wrapping after a definite constriction of the tubular portion has taken place, by butting of the edges 17 and 18, if desired.

In order to increase the grip of the collar 19 on the fitting, and particularly the grip of the fitting on the wrapping, one or more perforations 22 may be provided in the tubular portion of the fitting. Flow of the material of the collar and wrapping into these perforations, as shown in Fig. 3, results in secure anchoring of the parts to each other.

The particular fitting described is intended to be of the type which can be pushed through a hole in a wall, and will remain in place by reason of spring prongs which engage the far side of the wall. As these prongs must be elastic, and possess at the same time sufficient stiffness to resist pulling out, the reason for the use of tempered stock for the fitting becomes readily apparent. The fitting is shown as having prongs 23 bent outwardly. Lugs 24 bent inwardly, form an incomplete flange at the outer end of the fitting.

A typical application of the described fitting and conduit assembly is to brake housings. These housings vary in thickness and sometimes are rough or curved, at the point where they are pierced for the conduit. Accordingly, some means must be supplied to render the fitting tight. In the present instance, a conical spring washer 25 is supplied. This washer is continuous, as differentiated from a split washer, and thus would be incapable of elastic deformation if it were compressed between two flat surfaces. For this reason, three struck-out portions 26 are provided, which form a bearing for the small end of the washer. A compressive force on the washer results in a bending of the material of which it is made, rendering it no longer round. If the wall against which it bears is smooth, the deformation makes the washer take a sort of rounded triangular configuration, because of the three-point bearing it has against the struck-out portions of the fitting. Within limits, it will conform to irregular walls by taking whatever shape brings it most fully in contact with such walls.

I claim:

A conduit and fitting assembly including a conduit having a relatively hard outer surface, a layer of metal overlying part of said conduit, a fitting of relatively hard elastic material having a cylindrical portion overlying at least part of said layer of metal, said cylindrical portion having an interruption to its circumference extending along its length to constrict said layer of metal by elastic bending, a ring of metal having an inwardly extending flange, said ring overlying at least part of said cylindrical portion of the fitting and of the layer of metal openings through said cylindrical portion lying between said ring and said layer of metal, said flange extending inwardly clear of the cylindrical portion of the fitting toward the layer of metal, said ring and layer of metal being softer than the fitting and having portions deformed into said openings through said cylindrical portion and said layer of metal being impacted on the surface of the conduit.

References Cited in the file of this patent
UNITED STATES PATENTS

| | | |
|---|---|---|
| 724,129 | Schrader | Mar. 31, 1903 |
| 1,106,761 | Weikert | Aug. 11, 1914 |
| 1,215,595 | Weikert | Feb. 13, 1917 |
| 2,137,712 | Bratz | Nov. 22, 1938 |
| 2,236,130 | Betebenner | Mar. 25, 1941 |
| 2,258,941 | Wayman | Oct. 14, 1941 |
| 2,555,292 | Poupitch | May 29, 1951 |
| 2,685,467 | Booth | Aug. 3, 1954 |